J. CHOPPINET, G. GILLON AND V. DEFAYS.
APPARATUS FOR INDICATING THE DEVIATIONS OF A BOREHOLE FROM THE VERTICAL.
APPLICATION FILED JULY 2, 1920.
1,404,580.
Patented Jan. 24, 1922.
3 SHEETS—SHEET 1.
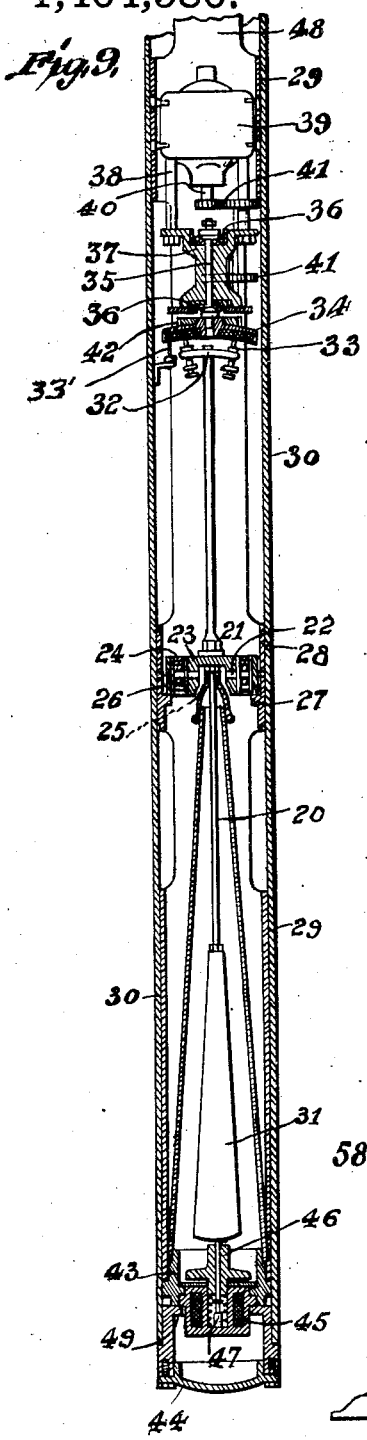
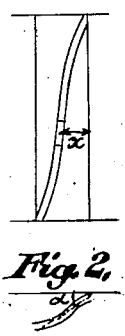
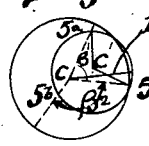
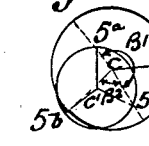
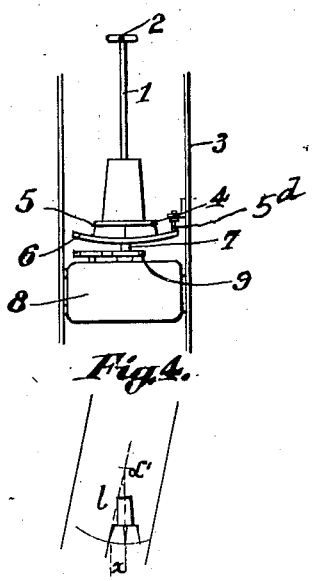
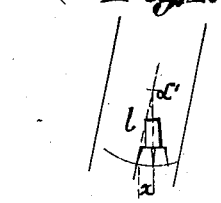
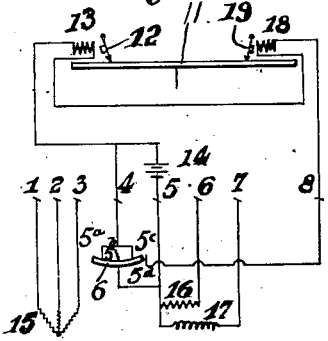
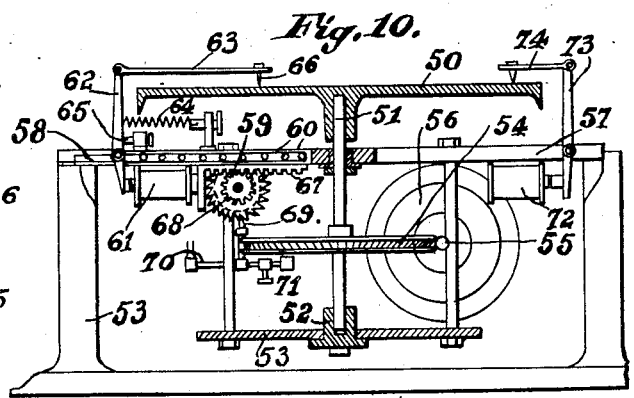
Inventors
J. Choppinet
G. Gillon
V. Defays
by [signature]
Atty.

J. CHOPPINET, G. GILLON AND V. DEFAYS.
APPARATUS FOR INDICATING THE DEVIATIONS OF A BOREHOLE FROM THE VERTICAL.
APPLICATION FILED JULY 2, 1920.

1,404,580.

Patented Jan. 24, 1922.

Inventors
J. Choppinet
G. Gillon
V. Defays by

Att'y

Fig. 15.

UNITED STATES PATENT OFFICE.

JOSEPH CHOPPINET, GUSTAV GILLION, AND VICTOR DEFAYS, OF BRUSSELS, BELGIUM.

APPARATUS FOR INDICATING THE DEVIATIONS OF A BOREHOLE FROM THE VERTICAL.

1,404,580.

Specification of Letters Patent. Patented Jan. 24, 1922.

Application filed July 2, 1920. Serial No. 393,728.

*To all whom it may concern:*

Be it known that we, JOSEPH CHOPPINET, GUSTAVE GILLION, and VICTOR DEFAYS, subjects of the King of the Belgians, residing at Brussels, Belgium, have invented new and useful Improvements in Apparatus for Indicating the Deviations of a Borehole from the Vertical, (for which we have filed an application in Belgium, April 23, 1919,) of which the following is a specification.

Boreholes which are made more particularly in mining investigations and for sinking shafts to a great depth are rarely absolutely vertical. Especially when such holes are bored for the purpose of freezing the ground around the shaft to be sunk, it is important that their deviation from the vertical shall not be too great in order that at a certain depth there shall not be a too great distance between them where it would be possible for a zone of ground to be left which would not be reached by the freezing action. It is therefore very advisable that it should be possible to ascertain the deviation of the borehole from the vertical, and the horizontal direction of such deviation. The present invention has for its object to determine these two factors at all depths.

It is based on the fact that a radius drawn on a spherical basin having a uniform rotational motion under a spherical surface concentric to the said basin and suspended from a rocking beam whose centre of oscillation is situated at the common centre of the two spheres, will pass through points that are equidistant from one another and also equidistant from the axis of the rocking beam at intervals of time which are equal so long as the centre of the rotating basin remains in the axis of the rocking beam but which change appreciably when the rocking beam shifts relatively to the rotating basin.

The intervals of time that separate the intersection of the moving radius with each of the above mentioned points, determine the position of the axis of the rocking beam relatively to the centre of the rotating basin. By noting these intervals of time it is possible to determine the distance between the centre of the basin and the axis of the rocking beam and the horizontal direction of said distance, that is to say, the horizontal direction of the deviation of the borehole, so that the length of the rocking beam being known, the amount of the said deviation can be calculated.

In applying this principle to the construction of an apparatus for determining the deviation of a borehole from the vertical, a rotating basin is mounted on an axle driven by a clockwork or other suitable motor fixed to the walls of a tube fitted into the borehole in such a manner that the basin will follow all the changes in the direction of the borehole when the tube is inserted therein. The basin is made of insulating material with an inserted radius of metal or other conductor of electricity, or vice versa, and its surface has the curvature of a sphere whose centre is situated at the centre of oscillation of a rocking beam suspended from the tube by means of a cardan device. This rocking beam carries at its lower part a number of brushes for instance three, whose ends are arranged at the points of a regular polygon situated in a plane at right angles to the axis of the rocking beam and having its centre on the said axis.

The point of suspension of the rocking beam and the centre of the rotating basin, are situated in the axis of the tube. According to the above stated principle, so long as there is no deviation of the borehole, and therefore the centre of the rotating basin is situated in the axis of the rocking beam, the radius will come into contact with the rubbing brushes at known equal intervals of time, but should any deviation occur relatively to the rocking beam, that is to say, relatively to the vertical, these intervals of time will assume totally different values which characterize the altered position of the rocking beam.

For measuring these intervals above ground, the brushes are connected each to an electromagnet situated above ground, and the armatures of the said magnets each actuate a recording stylus and thereby cause the latter to draw a line on a table which rotates synchronously with the spherical basin.

To enable the brushes to be brought into register there is placed along the radius of the position which is occupied by one of these brushes when the deviation is nil, a supplementary brush fixed to the wall of the tube of the measuring apparatus. This brush is designed to give an invariable supplementary contact at each revolution of the moving radius. This contact closes the circuit of a fourth electromagnet provided at the periphery of the rotating disc of the recording apparatus, for instance 180° from the first electromagnet.

This arrangement allows of identifying the lines drawn above ground by each of the brushes of the measuring apparatus inside the borehole, and plotting them in relation to one or more fixed points, for instance, to the lines drawn by the brushes when the deviation from the vertical is nil.

In order to enable the invention to be well understood it will now be described hereinafter with reference to the accompanying drawings in which:—

Figs. 1 and 2 are views of a borehole in vertical and horizontal projection showing on an exaggerated scale the deviations that occur in practice.

Fig. 3 is a diagrammatic view of the apparatus in vertical elevation.

Fig. 4 represents the apparatus in an inclined position when there is a deviation of the rotating disc relatively to the rocking beam.

Figs. 5, 6 and 7 are diagrammatic plan views indicating the relative positions of the brushes and the conducting radius respectively when the deviation from the vertical is nil, or directed towards the right, or directed towards the left.

Fig. 8 is a diagram of the electrical connections of the apparatus.

Fig. 9 is a vertical section of the measuring apparatus placed in the borehole tube.

Fig. 10 is a section of the registering apparatus situated at the surface.

Figure 15:
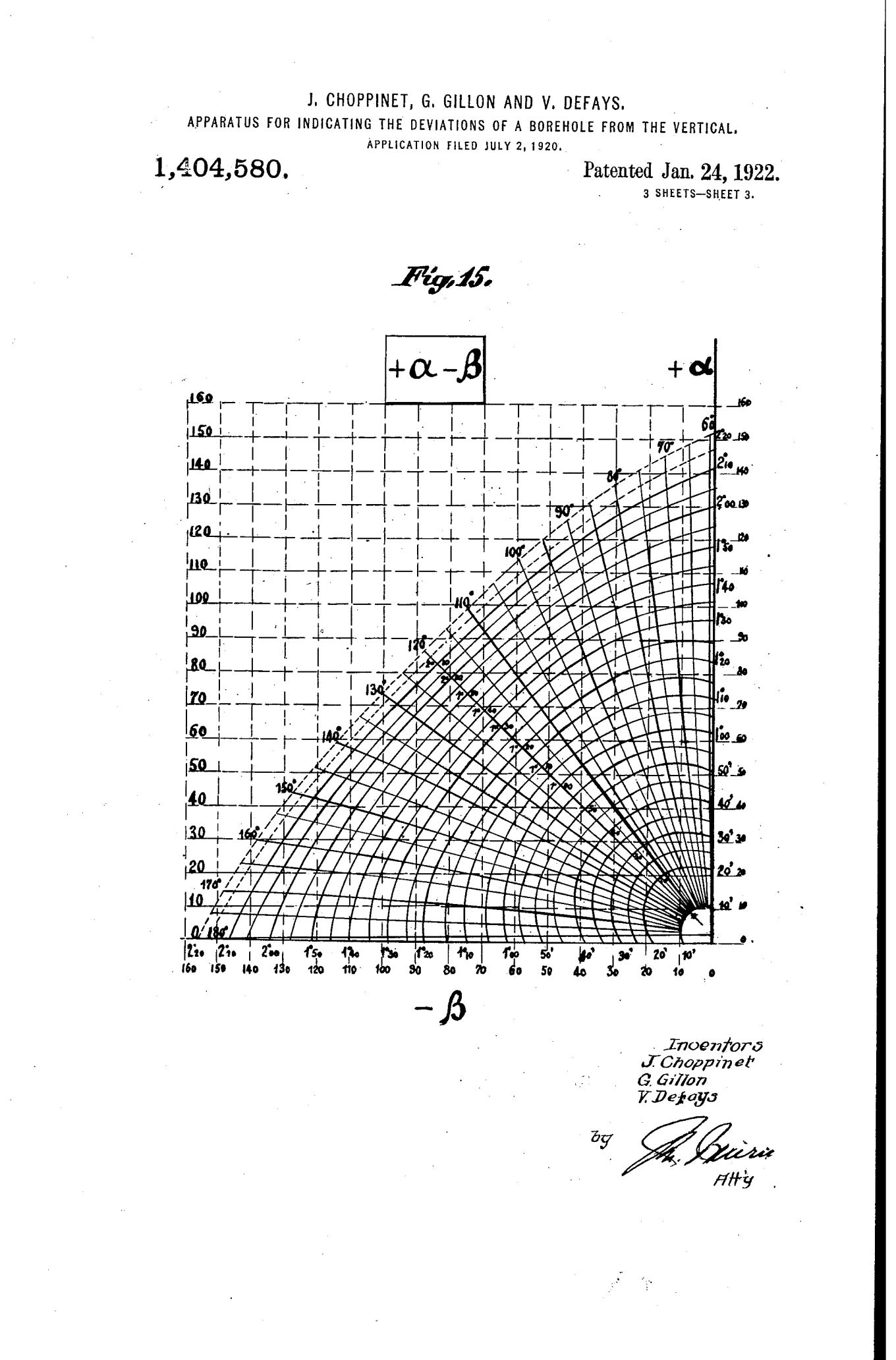
Figure 12:
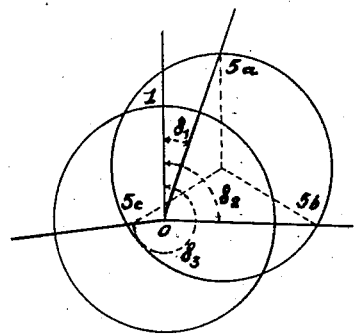

Figs. 11, 12, 13 and 14 relate to the indications given for various deviations by the measuring device on the recording device above ground. Fig. 15 is a diagram resulting from the use of the apparatus.

When going down to great depths or when the nature of the ground so requires, the borehole is provided with tubing for supporting the walls thereof.

The apparatus designed for measuring the deviations is inserted in the said tubing, and then a series of readings are taken at intervals of length of 10 metres for instance, for the purpose of ascertaining the mean amount of deviation of the tube and its horizontal direction for each such interval of length. The vectorial combination of all the deviations thus measured gives as its resultant the deviation X of the tube and its horizontal direction $\alpha$ (Figs. 1 and 2) relatively to a given direction for the depth in question. In other words, the series of readings made at 10 metre intervals allows of plotting a plan of the situation of the axis of the borehole relatively to two vertical planes at right angle to each other and of known direction.

The installation comprises two distinct apparatus: the first is the measuring apparatus proper which is lowered into the borehole down to the point which it is desired to measure the deviation, and the second is the registering apparatus which is situated above ground in the overseer's office. The two apparatuses are connected together by an electric cable comprising a plurality of wires. The lowering of the measuring apparatus in the borehole is effected by means of steel tubes connected together by sleeves which must be so constructed as to prevent any twisting of the tubes around their own axes, whilst however giving to the connected tubes as a whole sufficient flexibility for following the deviations of the borehole tubing. Since the latter is usually filled with water, the tube of the measuring apparatus is hermetically closed.

The measuring apparatus comprises a rocking beam 1 (Fig. 3) suspended by a cardan 2 or other analogous device from the protecting tube 3 in such a manner as to be able to assume freely a vertical position coinciding with the axis of the tube when the latter is vertical. To the lower part of this rocking beam is secured a plate 4 on which are mounted three brushes 5 (hereinafter identified $a$, $b$, and $c$, respectively) whose ends are arranged in the apices of an equilateral triangle situated in a plane at right angles to the axis of the rocking beam and having its centre on the said axis. To the tube 3 is secured a fixed brush or contact $5^d$. Below the brushes there is arranged a spherical basin 6 whose shaft 7 situated in the axis of the tube 3, receives uniform motion from a clockwork or an electric motor 8 through the medium of reducing gear 9.

Figure 11:
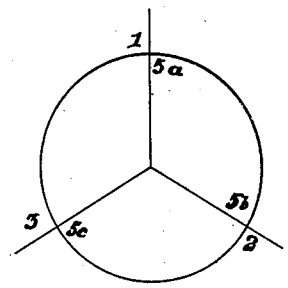
Figure 13:
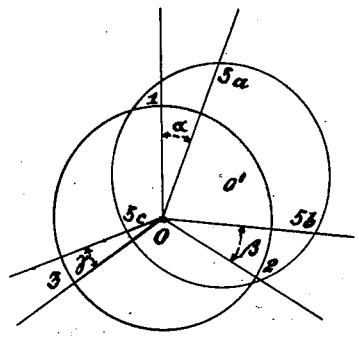
Figure 14:
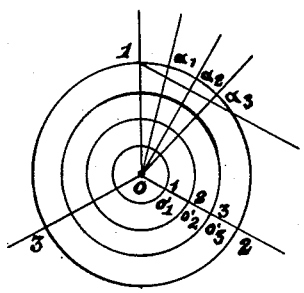

This motor is likewise fixed to the tube 3 which consequently carries also the basin 6. This basin therefore moves under the rocking beam when the tube 3 is inclined, but, owing to its sperical shape, it remains always in contact with the brushes. The basin is made of electrically insulating material, and carries a radius 10 formed of conducting metal. The reverse arrangement may also be adopted namely, a conducting basin with an insulating radius. When the tube is vertical the three brushes $5^a$, $5^b$, $5^c$ project horizontally on to a circumference which is concentric to the axis of the rocking beam (Fig. 5), and the intervals of time separating the meeting of the radius 10 with each of the brushes, counting from the radius $05^a$, correspond respectively to the angles 0°, 120° and 240° (Fig. 11). The position of the radius 01 on the measuring apparatus can be determined from the indication given by the fixed contact $5^d$ of the measuring apparatus.

If the tube deviates from the vertical, and the centre C' of the basin consequently moves away from the axis of the rocking beam, the intervals of time that separate the passing of the radius 10 over the register mark 1 and under each of the brushes, are proportional to the angles $\delta^1$, $\delta^2$ and $\delta^3$ (Fig. 12). The values of these angles characterize the deviation $c\ c'$ as regards its amount and direction.

It is to be noted that it is sufficient to know the angles $\delta^1$ and $\delta^2$, in order to determine the position of $C'$, because since the star-shaped figure of which the brushes constitute the three apices, remains parallel to itself so long as the tube is not twisted on its own axis, the value of $\delta^3$ is fixed by the values of $\delta^1$ and $\delta^2$.

There may be added to the register mark $5^d$ (indicated at 1 in Figs. 12 to 14) two other register marks 2 and 3 (Fig. 13) situated respectively 120° and 240° from the register mark 1, and the position of the three radii may be characterized by the angles $\alpha$, $\beta$ and $\gamma$ which they enclose respectively with the radii 01 02 and 03. These angles are to be considered as positive in the direction of the rotation of the hands of a watch, and negative in the opposite direction.

The angles $\alpha$, $\beta$ and $\gamma$ have as their several measures the lengths that separate the register marks from the lines marked by the electromagnets in correspondence with the brushes, at the periphery of the disc of the recording apparatus. These lengths characterize therefore the deviation as well as its horizontal direction. For instance considering in Fig. 14 a displacement of the centre $C'$ along the radius $C^2$, then $\beta$ will be always nil, and $\alpha$ is positive and increasing.

If the horizontal directions are reckoned from the point 0 of the said figure, the horizontal direction is in this case 60° reckoned in a counterclockwise direction, and the amplitude of $c\ c'$ expressed in degrees is:

| for | | | $\alpha$ |
|---|---|---|---|
| | $C'1$ | 1° | 10 |
| | $C'2$ | 2° | 21 |
| | $C'3$ | 3° | 32 |

Now to each of these positions of $C'$ there corresponds a strictly determined value of $\alpha$ which is measured by the lengths $1\alpha^1$, $1\alpha^2$, $1\alpha^3$ expressed for instance in millimetres. If the values $\alpha$ and $\beta$ corresponding to these three positions of $C^1$ are plotted along two rectangular axes, this will give three points of the curve of the positions of $C^1$ for a horizontal direction of 60° and an increasing amplitude.

Similarly the curves of the positions of $C'$ characterized by $\alpha$ and $\beta$ may be plotted for other horizontal directions and increasing amplitude at intervals of for instance 5°. This is shown in Fig. 15 which gives the curves of equal horizontal direction and varying amplitude. Then by joining in these various curves the points corresponding to one and the same amplitude $C\ C'$ of the deviation, there will give in this figure the curves of equal amplitude and variable horizontal direction, and those will constitute a diagram which will allow of finding for any two values of $\alpha$ and $\beta$ the amplitude and the horizontal direction of the corresponding deviation.

It is to be noted that for the sake of greater clearness it is advisable to draw three diagrams corresponding respectively, the first one to $\alpha$ positive and $\beta$ negative the second to $\beta$ positive and $\gamma$ negative and the third to $\gamma$ positive and $\alpha$ negative these diagrams being used each only for the angles of 120° of horizontal direction that give the clearest readings.

It is further to be noted that these diagrams may be plotted by actual experiment by imparting to the tube of the apparatus strictly determined inclinations and horizontal directions and reading of the lengths that measure the lengths of the corresponding angles $\alpha$, $\beta$ and $\gamma$. By this means all error proper to the apparatus is eliminated, because the means of reading the positions of the tube and the angles inscribed on the measuring apparatus are alone used to assure the accuracy of the measurements. This accuracy will therefore be very great.

Fig. 15 is a diagram plotted in this manner by calibration of the apparatus. If the deviations of the tubing are small relatively to the distance between the brushes, then the angles $\alpha$, $\beta$ and $\gamma$ will never exceed + 60°, and the indications relating to these three angles can be inscribed by one and the same electromagnet, the indication inscribed by $5^a$ being always nearest to the register mark 1, whereas the indication inscribed by $5^b$ is nearest the register mark 2.

The recording apparatus which serves for measuring the angles $\alpha$, $\beta$, $\gamma$, comprises a circular plate 11 actuated synchronously with the basin 6 of the measuring apparatus. On this plate 11 there is placed a sheet of paper upon which bears a stylus 12 carried by the armature of an electro-magnet 13. This latter is situated in the circuit of the brushes $5^a$, $5^b$ and $5^c$ fed from a storage battery 14 or other supply of direct current of for instance 16 volts. The shaft 7 of the basin forms part of the same circuit. This shaft is actuated preferably by a synchronous motor (Fig. 8) of which 15 is the triphase stator and 16 the rotor excited by direct current. 17 is the electromagnet of a brake that serves to stop the rocking beam when desired. The electromagnet 18 is connected to the contact $5^d$ and gives the register mark from which the angle $\alpha$ is reckoned.

It will be readily understood that each time contact is made between a brush and the radius 10, the circuit 13, 14 will be closed, and the stylus 12 will draw a radial line on the paper of the recording apparatus, and a line is likewise drawn at each revolution by the electromagnet 18. These four lines give the measure of the angles α, β and γ. Synchronism is checked as a matter of fact by the fact that the lines marked by the electromagnet 18, one at each revolution of the basin, should come over one another so as to constitute a single line of small thickness. In addition, in synchronism the lines that fix α, β and γ should likewise come over one another for each angle so as to form a single thin line. This coincidence does not take place when there is no synchronism, or when the rocking beam is still rocking at the time of taking the reading. The points 1, 2, 3 . . . 8 of Fig. 8 designate the leading-in terminals of current for the synchronous motor and the brushes or other circuits of the measuring apparatus. The conductors of the cable that connects the measuring apparatus to the recording apparatus above ground, end at these points.

Fig. 9 is a constructional example of the measuring apparatus which differs but very slightly from the elementary apparatus above described. The rocking beam 20 is suspended at an intermediate point from a Cardan device 21, the pins 22 of the inner ring 23 of which are mounted in ball bearings 24 that likewise carry the pins 25 of the outer ring 26. The latter rests on the shoulder 27 of a sleeve 28 fixed to a mount 29 which fits with light friction in the protecting tube 30. The rocking beam carries at its lower part a counterweight 31 and at its upepr part a plate 32 on which are mounted the brushes 33. To the tube 30 is secured a fixed brush 33' corresponding to the contact 5$^d$ shown in Figs. 3 and 8. The basin 34 is carried by a shaft 35 mounted by means of ball bearings 36 in a supporting member 37 fixed by means of bolts 38 to the casing 39 of the motor. The latter is fixed to the mount 29. The motor shaft 40 drives through gearing 41 a toothed wheel 42 fixed to the basin 34. This inverted position of the basin above the rocking beam is designed to prevent the deposit of matter in the basin formed by its concave surface which might prevent contact between the brushes and the conducting radius. At the base of the mount 29 there is fixed a ring 43 which rests on the bottom 44 of the protecting tube 30 and carries an electromagnet 45 whose armature 46 is pressed by a spring 47 against the counterweight in order to stop the rocking beam when the apparatus is not working. The mount 29 terminates in a handle 48 by means of which the apparatus can be introduced in one piece into the protecting tube 30 until the ring 43 rests upon the ring 49 of the bottom 44.

The recording apparatus comprises a circular plate 50 the shaft 51 of which is mounted in a footstep bearing 52 fixed to the frame 53. The shaft 51 is provided with a wormwheel 54 driven by a worm 55 fixed on the shaft of an electric synchronous motor 56 carried by the frame 53. The latter comprises a table 57 in which is formed a radial guide slot 58 designed to receive a sliding carriage 59 carried by a series of rollers or balls 60. This carriage carries an electromagnet 61 whose armature is fixed to a rocking lever 62 provided at its other end with a stylus-carrying arm 63. The lever 62 is pressed by a spring 64 against a stop 65, but the excitation of the electromagnet 61 causes this lever to rock in such a manner as to cause a radial line to be drawn on the plate 50 by the stylus 66. The electromagnet 61 is situated in the circuit of the brushes that rub on the basin.

It may be advisable to separate the circles described by the stylus 66 when readings are taken at different depths. For this purpose the carriage 59 is provided with a rack 67 meshing with a pinion 68 on the shaft of which there is mounted a wheel with inclined teeth which is caused to turn one tooth at a time by a special device actuated by a tappet for instance. This arrangement may consist of a bevelled pawl 69 working on the inclined surfaces of the teeth when it is caused to oscillate around the shaft 70 by means of the tappet lever 71. The tappet lever 71 is operated by hand whenever it is desired to alter the position of the stylus radially of the rotating table.

The contact 5$^d$ (Fig. 8) is connected to the electromagnet 72 whose armature is fixed to the rocking lever 73 which carries at its upper end a stylus-carrying lever 74.

It is obvious that modifications may be made in these constructional arrangements without departing from the nature of the invention.

We claim:

1. An apparatus for determining the deviations of boreholes, comprising a beam subjected to gravital influence, a rotating disk mounted to follow the deviations of the borehole, contact members arranged in predetermined order on the beam, a cooperating contact member arranged on the disk, and a recording device having circuits to be controlled by such contact members.

2. An apparatus as in claim 1, wherein the beam is suspended by a cardan device and a tube encloses the apparatus.

3. An apparatus as in claim 1, wherein the contact devices on the beam are brushes arranged equidistant on a circle whose center is in line with the axis of the beam.

4. An apparatus as in claim 2, wherein the cardan device supports the beam at an intermediate point, and said beam is provided with a counterweight beyond such point.

5. An apparatus as in claim 1, wherein means are provided for holding the beam against movement, and an electrical-operated release for such means.

6. An apparatus as in claim 1, wherein a tube is arranged to receive the operative parts, and a mount provided to support such parts and frictionally engage within said tube.

7. An apparatus as in claim 1, wherein the recording device includes a table adapted to be rotated in synchronism with the rotating disk.

8. An apparatus as in claim 1, wherein the recording device includes a table to rotate in synchronism with the rotating disk and carry a sheet of paper, and a marking stylus for such paper operated by said circuits.

9. In apparatus for determining the deviations of boreholes, the combination of a casing adapted to follow the deviations of the borehole, a rotating member in said casing, a beam subjected to gravital influence suspended within said casing at a point in line with the axis of said rotating member, contact members arranged in predetermined order on the beam, and a co-operating contact member on said rotating member.

10. In apparatus for determining the deviations of boreholes, the combination of a tubular casing adapted to follow the deviations of the borehole, a rotating member in the shape of an inverted spherical basin in said casing, a beam subjected to gravital influence suspended within said casing at a point coinciding with the center of curvature of said spherical basin, a counterweight on said beam below the point of suspension thereof, contact members arranged in predetermined order on the beam above its points of suspension, and a co-operating contact member on said spherical basin.

11. In apparatus for determining the deviations of boreholes, the combination of a casing adapted to follow the deviations of the borehole, a rotating member in said casing, a beam subjected to gravital influence suspended within said casing, contact members arranged in predetermined order on the beam, a further contact member in fixed relation to said casing, and a co-operating contact member on said rotating member.

12. An apparatus for determining the deviations of boreholes, comprising a beam subjected to gravital influence, a rotating member, a casing adapted to follow the deviations of the borehole, said casing enclosing said beam and rotating member, contact members arranged in predetermined order on the beam, a further contact member in fixed relation to said casing, a co-operating contact member on said rotating member, and a recording device having circuits controlled by the co-operation of the last mentioned contact member with the contact members on the beam and with the contact member on the casing respectively.

13. An apparatus for determining the deviations of boreholes, comprising a casing adapted to follow the deviations of the borehole, a beam subjected to gravital influence suspended within said casing, an electric motor in said casing, a rotating member actuated by said motor, contact members arranged in predetermined order on the beam, a co-operating contact member on said rotating member, and a recording device having circuits to be controlled by said contact members, a marking stylus operated by said circuits and a table adapted to be rotated in synchronism with said rotating member.

14. An apparatus as in claim 13 having means for moving the marking stylus step by step radially of the rotating table.

15. In apparatus for determining the deviations of boreholes, the combination with the elements recited in claim 9 of means for holding the beam in fixed relation to the casing, and an electromagnet adapted to render said holding means inoperative.

In testimony whereof we have signed our names to this specification in the presence of two subscribing witnesses.

JOSEPH CHOPPINET.
GUSTAVE GILLON.
VICTOR DEFAYS.

Witnesses:
M. V. KIRKPATRICK,
GEO. B. ALENES.